J. W. JONES.
TAXIMETER.
APPLICATION FILED NOV. 18, 1909.

1,059,050.

Patented Apr. 15, 1913.
7 SHEETS—SHEET 2.

Fig. 3

J. W. JONES.
TAXIMETER.
APPLICATION FILED NOV. 18, 1909.

1,059,050.

Patented Apr. 15, 1913.

Witnesses:
Gustave R. Thompson
M. A. Wood

Inventor
Joseph William Jones.
By his Attorneys
Mauro, Cameron, Lewis & Massie

J. W. JONES.
TAXIMETER.
APPLICATION FILED NOV. 18, 1909.

1,059,050.

Patented Apr. 15, 1913.

J. W. JONES.
TAXIMETER.
APPLICATION FILED NOV. 18, 1909.

1,059,050.

Patented Apr. 15, 1913.
7 SHEETS—SHEET 6.

Fig. 11

J. W. JONES.
TAXIMETER.
APPLICATION FILED NOV. 18, 1909.

1,059,050.

Patented Apr. 15, 1913.

UNITED STATES PATENT OFFICE.

JOSEPH WILLIAM JONES, OF NEW YORK, N. Y., ASSIGNOR, BY MESNE ASSIGNMENTS, TO KNICKERBOCKER TRUST COMPANY, TRUSTEE, OF NEW YORK, N. Y.

TAXIMETER.

1,059,050.  Specification of Letters Patent.  Patented Apr. 15, 1913.

Application filed November 18, 1909. Serial No. 528,713.

*To all whom it may concern:*

Be it known that I, JOSEPH WILLIAM JONES, a citizen of the United States of America, and a resident of New York city, New York, have invented a new and useful Improvement in Taximeters, which improvement is fully set forth in the following specification.

The invention relates to indicating and registering devices for vehicles, particularly vehicles for public hire, commonly known as "taxicabs."

One object of the invention is to protect the passenger against overcharge, by keeping him continually informed of what he owes as "fare" and "extras" (if any), without charging him for time lost as by break-downs, etc.

Another object of the invention is to protect the owner of the vehicle, by keeping a record of the total sums earned by the vehicle and to be turned in by the driver; also to advise the owner generally as to the use of his taxicab during the day, by recording not only the total distance traveled, but also the non-charged distance traveled (as in returning to the garage, etc.), and by recording the total time (if any) during which the vehicle, although engaged, has been delayed by causes for which the passenger should not pay,—which features serve as a check on the driver's returns.

Still another object of the invention is to protect the driver by preventing unauthorized persons from tampering with the apparatus and thereby entering charges not earned or received, to the loss of the driver or of the passenger. And, finally, to prevent the driver from altering the record to cheat the passenger or the owner.

In short, the object of my invention is to give a continuous, mechanically-accurate, and unchangeable record of the transactions of the vehicle, for the protection of all parties concerned.

The most conspicuous feature of the taximeter is the "flag" by which all the operations of the apparatus are controlled, and whose position indicates at a glance whether or not the vehicle is "vacant" or "engaged", and if the latter, at which tariff. Other visible features in the front of my taximeter and in view of the passenger comprises (1) a dial which shows the condition of the taximeter: whether the lower rate ("Tariff No. 1") is being charged, as for one or two persons only, or the higher rate ("Tariff No. 2") for three or more passengers, or that "no charge" is being recorded in case of a break-down or other delay for which the passenger should not be required to pay; (2) a series of dials which show in dollars and cents the amount of charges the passenger has incurred; and (3) a second series of dials which show in dollars and cents the amount due from the passenger for "extras", baggage, etc.—these two sets of dials being referred to as "trip dials", "trip fares" and "trip extras" respectively. At the rear of the apparatus are visible the "totaling dials", viz: (4) a series of dials which show in dollars and cents the total charges for the day, including "extras" as well as regular "fares"; (5) a series of odometer dials which show in miles and tenths the total mileage traveled during the day (whether charged or not); (6) a second series of odometer dials which show in like manner the total mileage charged up to passengers; (7) a dial which shows the total non-charged time (if any) during occupancy by passengers; and (8) an aperture-keyhole for charging up the "extras."

The mechanical and functional features of my novel taximeter comprise the following: First: The flag and its shaft which absolutely control all the other parts of the apparatus, bringing them into operative relations in certain of its positions, and locking them against operation in its "vacant" position. Second: Means for holding the flag in its various positions, and likewise means for locking it securely in the position. Third: The normal operating parts, viz: The driving-shaft, driven from the vehicle-wheel or the like (as by flexible shafting), for imparting movement to the dollars-and-cents dials (both trip dials and totaling dials), to indicate the amount to be charged for the distance traveled; the time-clock for imparting to the said dials the amounts to be charged for the time consumed; the dials themselves; a train (gears, etc.) for imparting the movement from said shaft to the dials for charging at one tariff; a related train for imparting such movement at a higher rate for charging at the other tariff; and a third related train for imparting movement from the clock to said dials (when the vehicle is stationary); and means actuated by the flag for bringing into operation the respective operating-devices referred to, including means for charging up the initial fare. Fourth: Means actuated by the flag for restoring the "trip dials" to zero. Fifth: Means actuated by the return-to-zero devices, to prevent the charging up, against a new passenger, of any portion of a unit of charge left over from a previous trip. Sixth: Means to prevent any one from tampering with the dials to increase or diminish the charges, by "pumping" the flag (moving it backward and forward). Seventh: Means for charging "extras", likewise means for adding said charges upon the trip-dials and the totaling-dials, and means operated by the flag for preventing the charge during the driver's absence, or before the passenger engaged the vehicle. Eighth: Means actuated by the operating shaft (which is driven from the vehicle wheel) for recording the total mileage, other means actuated from said shaft for recording paid mileage, and means actuated by the flag for bringing the last-named means into operation. Ninth: Means actuated by the flag for stopping the clock when the vehicle is not engaged, and for starting it up again when the vehicle becomes engaged. Tenth: Means actuated by the flag for setting in motion the devices for recording the non-charged time consumed.

My invention consists of and comprises each of the foregoing features and all the various combinations of two or more of them, as hereinafter set forth and claimed.

The invention will be best understood by reference to the annexed drawings that illustrate preferred embodiments.

In these drawings

Figures 1, 2, 5:
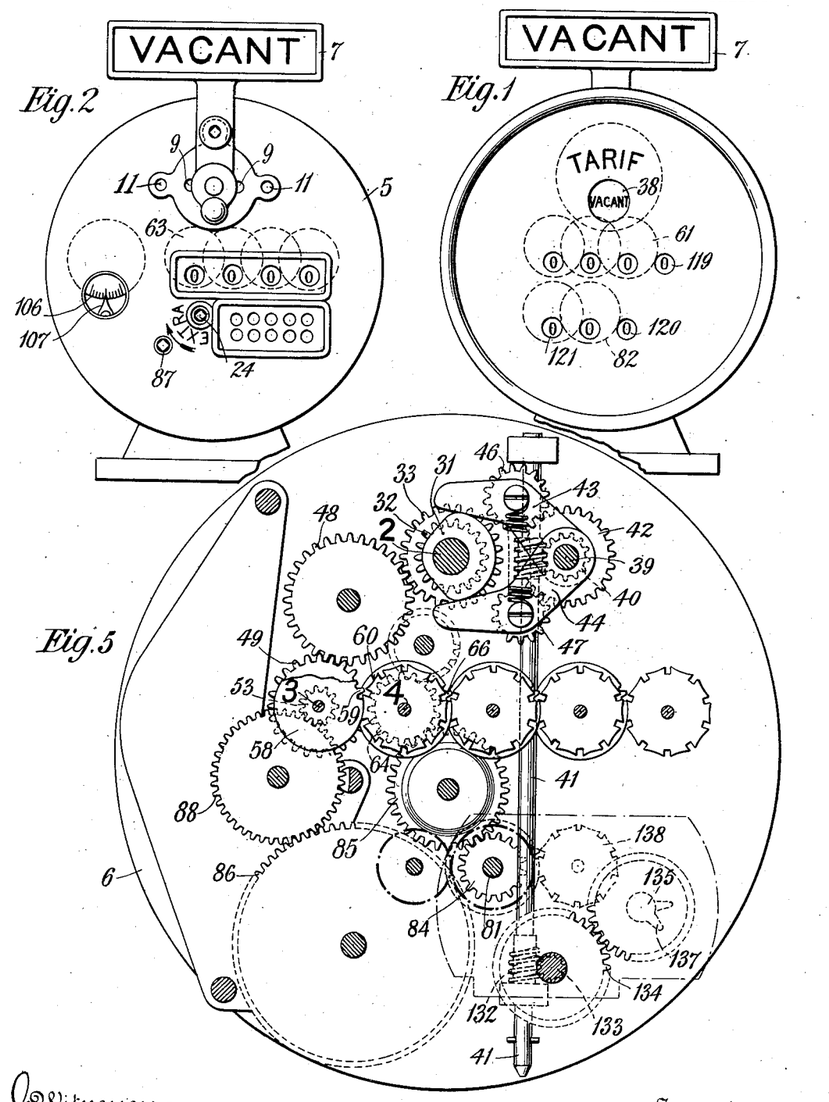
—Figure 1 is a front view of the complete apparatus within its casing.
Fig. 2 is a back view of the same.
Fig. 5 is a back view of the front plate of the mechanism, with certain adjacent parts, the main portion of the mechanism being removed.
Figure 3:
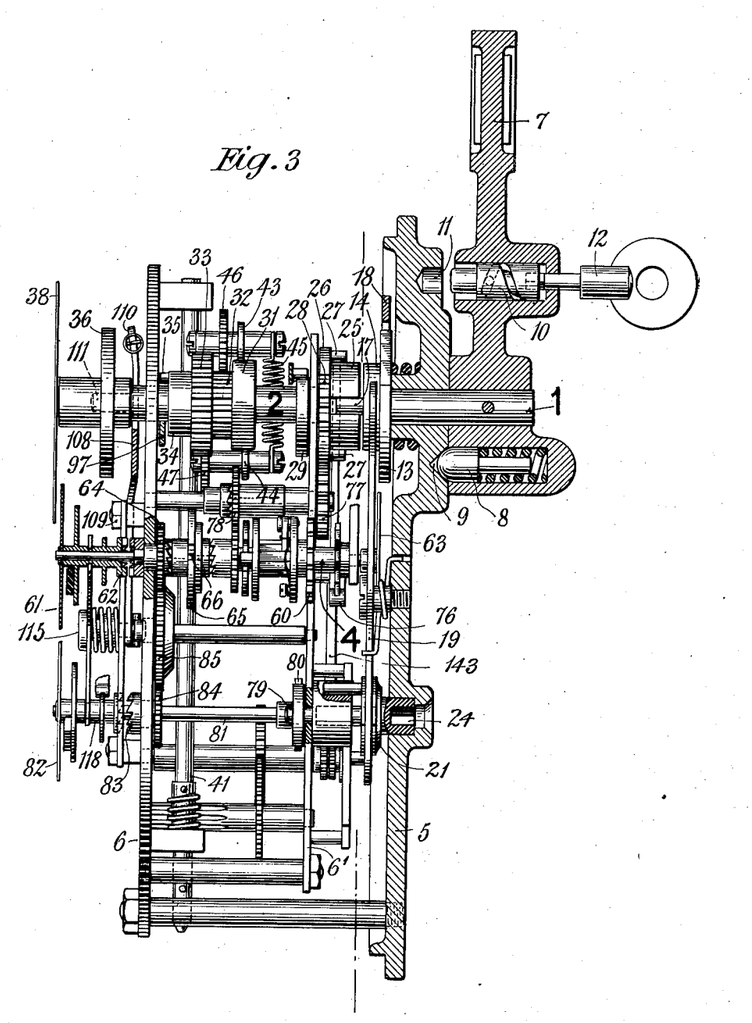
Fig. 3 is a side view, on an enlarged scale, of the mechanism removed from its casing.

In the apparatus there are four shafts that serve important co-related functions: "flag-shaft" 1, "controlling-shaft" 2, "transmission-shaft" 3, and "operating-shaft" 4, whose relative positions are shown by Figs. 5 and 3. The flag-shaft initiates, and thereby controls, all operations; the controlling-shaft controls the engagement and disengagement of the trains leading to the transmission-shaft, likewise returning the dials to zero and performing a number of other functions; the transmission-shaft receives the movements of the trains from the vehicle and of the train from the clock, and transmits them to the operating-shaft; the operating-shaft receives the movements transmitted by the transmission-shaft and imparts all movements to the dials. Consequently, in this specification, the description will commence from the flag-shaft and its attachments, proceeding in natural order, through the various trains and connections, to the dials; and the construction of the parts will be first described generally, and then in more detailed fashion in connection with their various functions.

*The flag and its shaft.*—The apparatus is inclosed in the cylindrical casing indicated in Figs. 1 and 2. The back-plate 5 of this case and the plates, as 6—6' (see Fig. 3), secured parallel thereto by spacing posts, constitute the frame of the mechanism. 7 is the "flag" whose position indicates whether the vehicle is "engaged" or "vacant". The flag is on an arm or lever that is fast on flag-shaft 1 that journals in back-plate 5; and the other end of this lever is provided with the spring-pressed plunger 8, which is adapted to hold the flag in any of its four positions of adjustment by engaging one of the seats 9 in the adjacent face of the back-plate 5. A device 10 in the flag-arm is adapted to enter other seats 11, and lock the flag in its various positions of adjustment. This lock 10 is controlled by a removable key 12. All the manipulations of the apparatus are performed by manipulating the flag except that in charging "extras" one other manipulation is performed by the same key, but this latter manipulation cannot take place until after the flag has been moved from its "vacant" position. Consequently, the attendant by locking the flag (as at "vacant") and removing the key can absolutely prevent any tampering with the apparatus.

Figure 10:
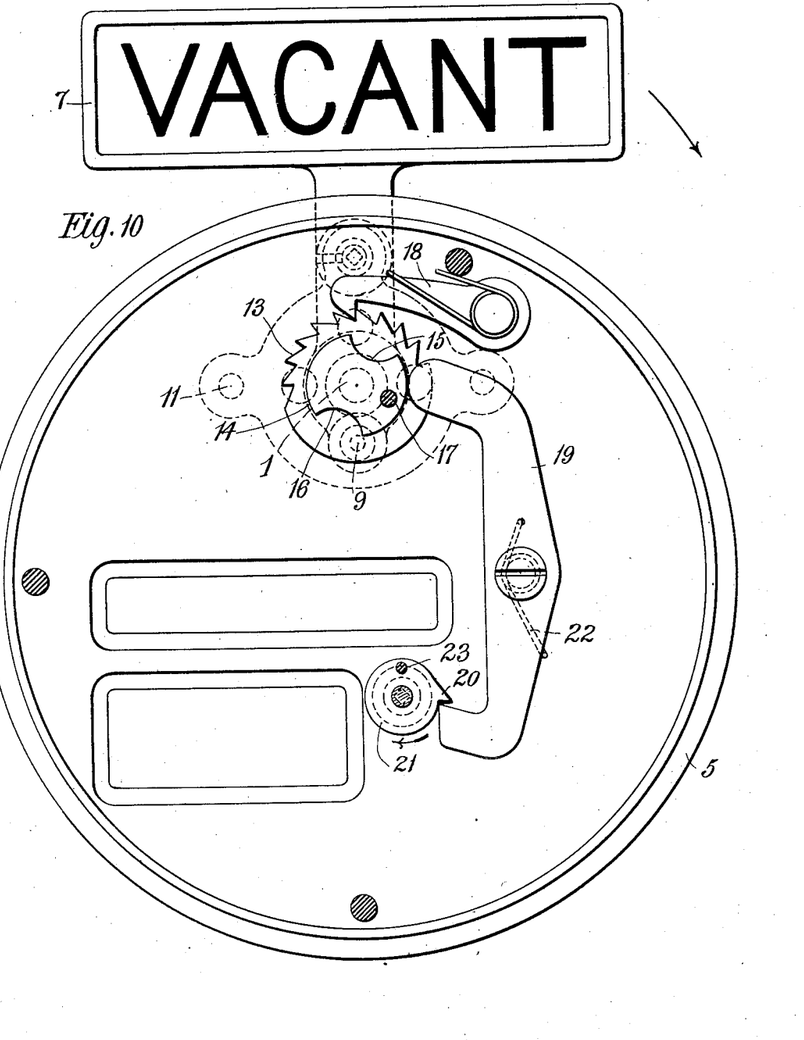
Fig. 10 is a front view of the back plate, with certain adjacent parts relating to the control of the flag-shaft.

The flag-shaft (Fig. 3) extends forward from back-plate 5 a short distance only, and carries three devices, viz: a disk 13 having a half-ratchet, viz: ratchet-teeth around one-half of its periphery, a second disk 14 having the diametrically opposite cam-seats 15 and 16 (for controlling the charging of "extras"), and a stud 17 (which latter engages the operating-shaft 2). 18 is a spring-pressed pawl that, during its engagement with the ratchet 13, permits the flag to move in one direction only (clockwise, as indicated by the arrow in Fig. 10).

The half-ratchet co-acts with the pawl during the movement of the flag through the first quadrant (from "vacant" to "tariff 1") and likewise during the movement through the fourth quadrant (from "tariff 2" back to "vacant"); but produces no effect during the movements through the second and third quadrants. The mechanism which causes the dials to register the initial charge is actuated by the passage of the flag (clockwise, in Figs. 1 and 10) through its first quadrant, to "Tariff 1"; and, but for this half-ratchet, the attendant might move his flag in the reverse direction (counter-clockwise) and thereby avoid registering the initial charge. And, on the other hand, but for this part of my invention, the attendant, by "pumping" his flag backward and forward in this first quadrant, could register several initial charges against one passenger. And, in the third place, the mechanism which causes the trip-dials to return to zero is actuated by the movement of the flag through its fourth quadrant; therefore the attendant, in order to show his flag at the "Vacant" position, must move it all the way around through the fourth quadrant, and cannot turn it backward. Yet, on account of the absence of ratchet-teeth around the other half of the periphery of disk 13, he can shift his flag from "Tariff 1" to "Tariff 2" and vice versa, according to the number of passengers on any one trip.

Figure 11:
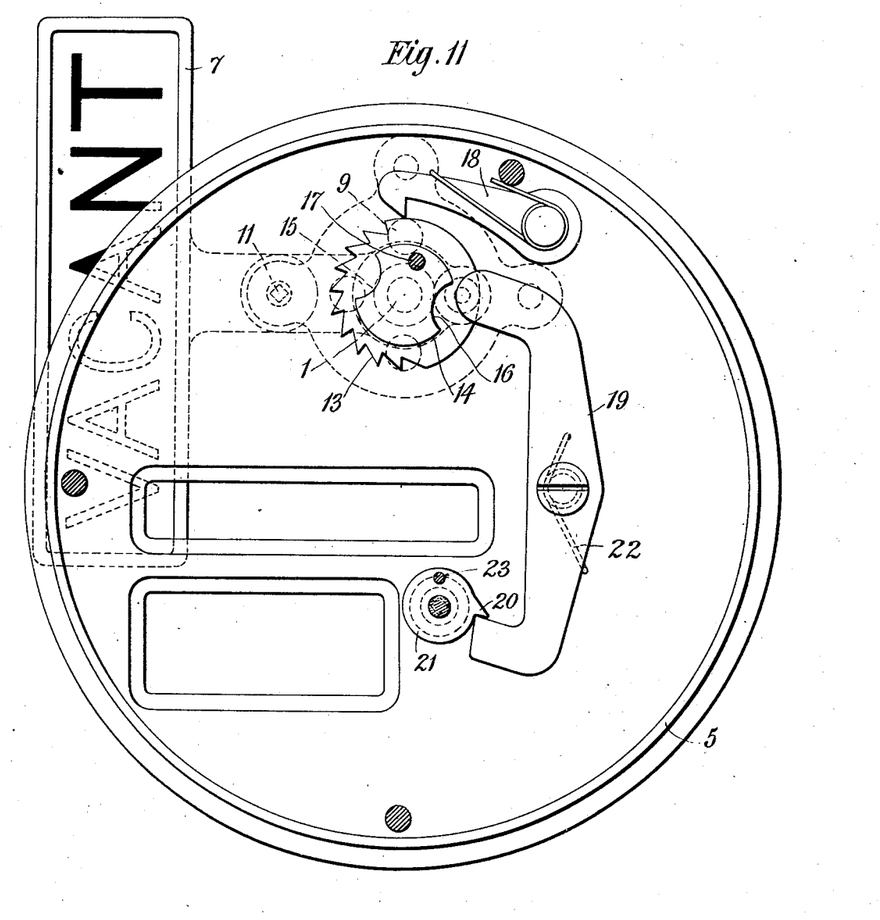
Fig. 11 is the same as Fig. 10, but with the flag in a different position.

*Lock for "extras".*—19 is a lever pivoted upon back-plate 5, and having its upper end bearing against the periphery of the disk 14, on the flag-shaft, and adapted to enter the cam-seats of said disk; while its lower end serves as a pawl to co-act with the single ratchet-tooth 20 on head 21, by which the attendant will charge up "extras". A spring tends to hold the lower end of lever 19 in engagement with this tooth 20 to lock the latter against advance. The head 21 carries a pin 23 (which actuates the "extra-charge" devices), and at its rear is operated by the same removable key 12 which is inserted from the back of the case into the barrel 24 (Figs. 2 and 3). The parts are so arranged that when the flag is in its upper or "vacant" position (Fig. 10), the periphery of disk 14 forces the upper end of lever 19 to the right, and thereby locks the head 21 and the "extra" charging devices against operation; but when the flag has been moved down to the right, for Tariff 1, as explained below, or all the way around to the left, for Tariff 2, as shown in Fig. 11, then (and then only) cam-seat 15 or 16 permits the upper end of lever 19 to be moved to the left, thereby permitting head 21 to be rotated to charge up the "extras". By means of this construction, "extras" can be charged up only when the flag is in one of the two "engaged" positions. The attendant cannot record any extra charge just before accepting a fare, nor can some mischievous idler record such charges against the attendant himself.

*Primary operating parts, controlling shaft.*—As is well known taximeters are intended primarily to record the charge for the distance traveled, and secondarily to record the charge for the time consumed when the vehicle though engaged is standing still. Moreover, in their preferred form they are adapted to record either of two different tariffs (according to whether there is a smaller or larger number of passengers), referred to as "Tariff 1" and "Tariff 2" respectively. In my improved taximeter the "controlling-shaft" 2 is operated by the flag to bring into play either "Tariff 1" or "Tariff 2", and likewise to bring into play the operation of the clock and to perform certain other functions. This controlling-shaft 2 has at its rear a head 25 provided with a seat that engages pin 17 of the flag-shaft, by which it is turned in accordance with the turning of the flag. In fact, the flag-shaft might be continued integrally as the controlling-shaft, but for convenience in assembling and disassembling the parts they are preferably separate. Along this controlling-shaft, from rear to front, are found devices for operating the following features, viz: means for making the initial charge with means for connecting the secondary odometer-dials (that register distance traveled while the vehicle is "engaged"); means for starting and stopping the clock; means for driving the dials at Tariff 1 or at Tariff 2; means for indicating the times elapsed, but not charged for, while the vehicle is engaged; means for resetting the dials at zero; and a device to indicate whether the vehicle is "engaged" etc. More particularly, these several means are as follows: a disk 26 secured adjacent head 25 and having two diametrically opposite pins 27 extending parallel with the shaft, for bringing into and out of operation the secondary odometer devices (for paid mileage, as explained below), and having likewise the partial gear 28 (see Fig. 3) for registering the initial charge (as explained below). The drawing shows head 25 with its disk 26 as located at the rear of the frame-plate 6' (Figs. 3 and 17); preferably they are keyed detachably upon the shaft 2. On this same shaft, and in front of this plate, is the disk 29 having a flattened or cam-surface 30 for starting and stopping the clock (as explained below). Still further along shaft 2 is the cam 31; and beyond this are the smaller gear 32 and the larger gear 33, fast together but turning freely on shaft 2, to constitute a differential. This differential and the cam 31 serve (as explained below) to transmit to the dial-trains motion from the vehicle, for "Tariff 1" or "Tariff 2", according to which of the gears 32 or 33 is acted upon. The differential-gears are held from longitudinal movement by cam 31 and the collar 34 secured to the controlling-shaft in front of them. A pin 35 extends from this collar (Figs. 3 and 4) to actuate means for causing the clock to register the non-charged time. Beyond this and near the front of the shaft 2 is a disk 36, having a cam-seat 37 (Figs. 3, 6 and 8), for actuating the mechanism for returning the dials to zero. And beyond this and at the extreme front of the shaft 2 is a dial 38 (Fig. 3, also Figs. 6, 7, and 8) which shows through an opening in the face of the instrument whether the vehicle is "Vacant" or at "Tariff 1" or "Tariff 2" or "Not Recording" (see Fig. 1).

Beginning at the two gears 32 and 33 that are loose on shaft 2, and referring to Figs. 5 and 3, the mechanism for registering "Tariff 1" and "Tariff 2" will now be described. 39 is a counter-shaft parallel with controlling-shaft 2, and carrying a worm-gear 40 in mesh with a worm on vertical shaft 41, which latter is suitably mounted in the frame and driven, as by a flexible shafting or the like, from the vehicle-wheel or other moving part. 42 is a wide gear fast on counter-shaft 39. 43 and 44 are two transverse arms pivoted loosely on counter-shaft 39, extending one above and the other below the cam 31 on controlling-shaft 2, and drawn toward each other by a spring 45. On each arm is carried a floating-gear constantly in mesh with wide gear 42. One floating-gear, 46, lies in the plane of the smaller differential 32, and is adapted to engage therewith when cam 31 permits; and the other floating-gear 47 lies in the plane of the larger differential 33, to engage therewith when the cam permits. The parts (from the flag on) are so arranged and proportioned that when the flag indicates "Vacant" or "Not Recording," both gears revolve idly; but at Tariff 1 (for the fewer number of passengers) the larger differential is engaged, and transmits the motion of the vehicle accordingly; and when Tariff 2 is indicated by the flag, the smaller differential is engaged, and transmits motion to the dials at a correspondingly higher rate (for a greater number of passengers). Still referring to Fig. 5, since differential-gears 32 and 33 are secured fast together, whichever tariff is being registered, in either case the motion is imparted to gear 33, and by the latter transmitted to intermediate gear 48 (Fig. 5), thence to a gear 49 loose on the transmission-shaft 3 (see also Fig. 15), but having ratchet-and-pawl engagement therewith.

*The transmission-shaft.*—This transmission-shaft 3 (see Figs. 14 to 15ª) carries a barrel 50 keyed thereon through slot 51, so that the shaft 3 has slight longitudinal play through the barrel, and also through gear 49; and the ratchet 52 is a continuation of this barrel. Upon this barrel as a journal turns gear 53 (which receives movement from the clock), having pawl-engagement with the same ratchet 52. Upon the rear end of the shaft 3 is the loose sleeve 54, having in its rear face a number of transverse seats 55 to receive the transverse pin 56 carried by the shaft 3, to constitute a clutch. Normally a flat spring 57 bears against the rear end of shaft 3 to force the pin 56 into its seat, so as to cause sleeve 54 to revolve with the shaft. Upon this sleeve is a disk 58 carrying a single tooth 59 which, at each complete revolution advances, by one step, a Geneva gear 60 upon the "operating-shaft" 4 (see also Figs. 5, 12, and 15ª), so that movement from the vehicle and movement from the clock are independently imparted to the transmission shaft, and thus to the controlling-shaft and ultimately to the dials.

Figures 4, 16, 17:
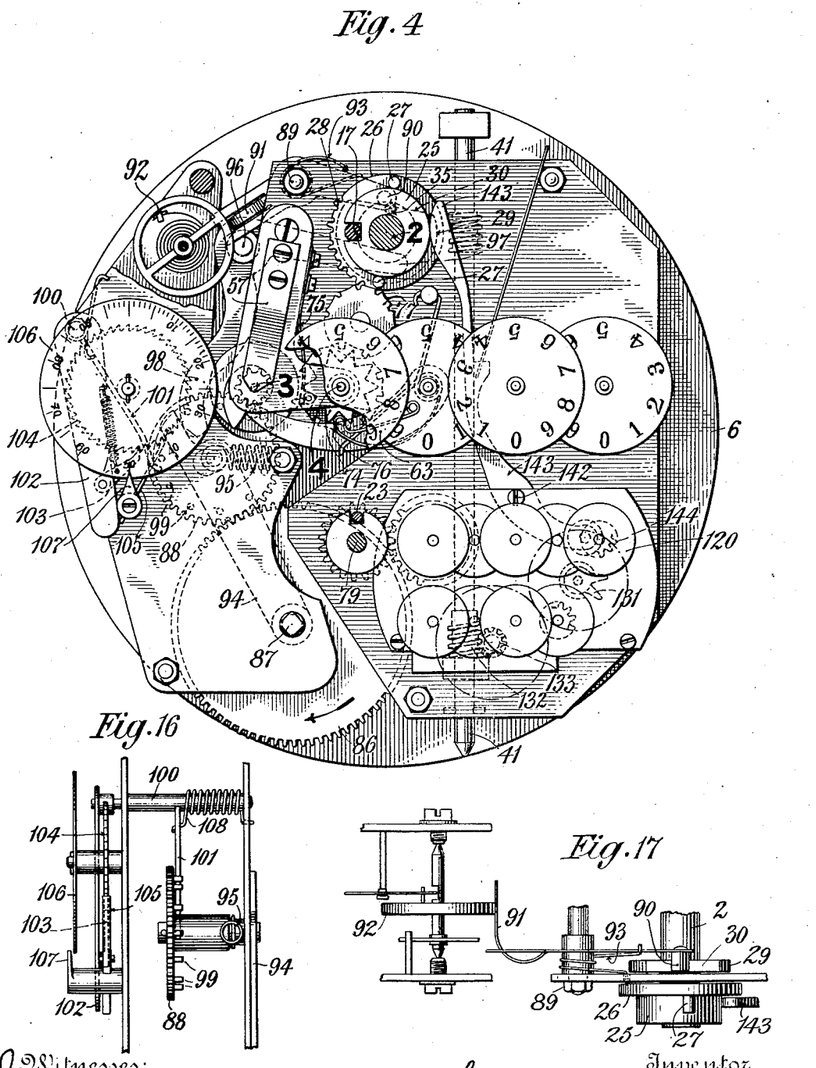
Fig. 4 is a back view of the mechanism.
Fig. 16 is a side view of a detail relating to the uncharged time recorded from the clock.
Fig. 17 is a plan view of details for stopping and for starting the clock.
Figures 12, 12A, 12B, 13:
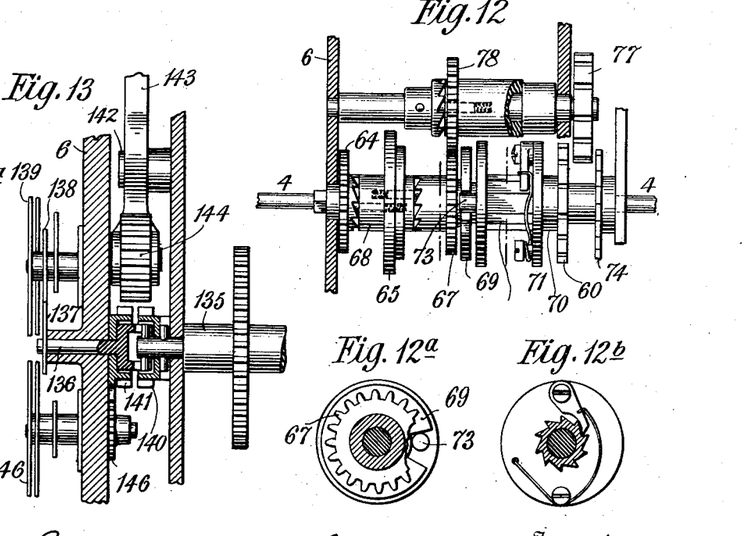
Fig. 12 is a side view of the operating-shaft, and certain related parts, from which movement is imparted to the dials, and which shaft is operated either from the vehicle-wheel or by the clock, being also operated at the outset by the flag to charge up the initial charge.
Figs. 12a and 12b are further details relating to the same.
Fig. 13 is a side view of certain parts of the odometer, the same being partly shown in Fig. 4.
Figure 13A:
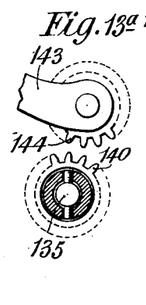
Fig. 13a shows details relating to Fig. 13.

*The operating-shaft and dial-trains.*—The operating-shaft 4 is shown in a side view in Fig. 12, also in Fig. 3; and its position is indicated in Figs. 4 and 5. This shaft extends entirely through the apparatus, carrying at its front the first (right-hand, in Figs. 1 and 7) of the trip-dials 61, which has ratchet-and-pawl clutch-engagement therewith (as at 62, Fig. 3); and at its rear the controlling-shaft 4 carries the first (left-hand, in Fig. 2) of the totaling-dials 63. Immediately at the rear of frame-plate 6, is the loose gear 64, which has ratchet-and-pawl engagement for imparting to the operating-shaft movement received from the train for charging up "extras" (to be explained below). Next is found the disk 65, fast on operating-shaft 4, and carrying a single tooth 66 (see Figs. 3 and 5), which actuates the shaft of the next succeeding totaling-dial. Next on the shaft 4 is the loose gear 67 having ratchet-and-pawl engagement for imparting the initial charge to the controlling-shaft (as already explained). Preferably a spring-pressed plunger 68 located in the sleeve or disk 65 co-acts with a crown ratchet on the face of loose gear 64, and a similar spring-pressed plunger co-acts with the crown gear on the adjacent face of the sleeve of loose gear 67,—whereby these respective loose gears have their ratchet-and-pawl engagement with the shaft 4. Fast on gear 67 is a disk 69. Further along on controlling-shaft 4 is the sleeve 70 turning freely on the shaft and carrying disk 71 and the Geneva gear 60 that receives motion from the tooth 59 carried upon the transmission-shaft 3 as already explained. This disk 71 is provided with spring-pressed pawls to engage a ratchet barrel 72, which is loose on shaft 4, but carries a pin 73 which has slight play in a cut-away portion of the disk 69 (that is carried by loose gear 67), see Fig. 12ª. Still farther along upon shaft 4 and fast thereto are the star-wheel 74 and the dial 63. The motion of shaft 4 is counter clockwise when viewed from the rear (Figs. 3 and 5). The rotation of any one of the ratchet-gears on this shaft does not affect any of the others or their driving-trains, but merely rotates the controlling-shaft; and the tooth 66 on disk 65 of this shaft actuates the succeeding dials of the totaling series at the back of the apparatus, in the well-known manner; while a similar tooth upon the hub of the front dial (which is mounted upon the spindled front end of the controlling-shaft by a clutch-ratchet) actuates the succeeding dials on the trip series in front.

Co-acting with the star-wheel that is fast on the controlling-shaft 4, are two spring-arms 75 and 76 (Fig. 4), which serve to bring the star-wheel (and the dials) into position with a quick snap, and to hold the same in position, until the next complete revolution of the transmission-shaft and its tooth 59. The dials are advanced step by step, intermittently and with quick action, and not continuously with slow, steady movement; and the inclined surfaces of the star-teeth of wheel 74 serve as a cam for the bent V-shaped double spring 76.

*The initial charge.*—The partial gear 28, carried by disk 26 on the rear of controlling-shaft 2 (Figs. 3 and 4), is shown as consisting of a succession of spaced teeth for engaging the Geneva gear 77, to rotate the latter clockwise (Fig. 4). On the shaft of this gear 77 is a loose gear 78 (Fig. 3), having pawl-and-ratchet engagement therewith, to impart movement to the gear 67 carried on the "operating-shaft" 4 as explained (see also Fig. 12). This partial gear 28 will therefore serve for registering upon the dials the initial charge; but it is so located with respect to the flag, that it operates upon the Geneva gear only while the flag is passing through its first quadrant (from Vacant to Tariff 1). Thereafter, no further initial charge can be recorded until the flag has been carried the entire way around to its initial position; but this last movement, as explained below, restores the trip-dials to zero, thus preventing the attendant from recording any further charge against the same passenger or passengers. And it will be recalled that the locking-mechanism 14—19—20, prevent this partial-rack 28 from being actuated more than once on a single trip. The number of teeth on this partial-gear 28, and the number of teeth on the other gears, are such that the traverse of the gear will suffice to register the proper amount (in practice, at the present time, 30 cents, which is charged in advance for the first one-half mile). But, as already stated, the head 25 with the disk 26 that carry this partial-gear 28, are detachable so as to be interchangeable; and by substituting another partial-gear having a greater or less number of teeth, the amount of the initial charge can be made to conform to the prevailing tariff regulations.

*Charging up extras.*—The pin 23 on the head 21 (Fig. 10) engages a seat in the head of shaft 79 (Fig. 3) which at its forward end carries another head 80, that has a single tooth actuating a Geneva gear on the shaft 81. At the forward end of this shaft 81 is the first of the "extra" dials 82, which has ratchet-and-pawl clutch-engagement 83 with the shaft 81, while a gear 84 fast on the same shaft 81 drives intermediate gear 85, that is in mesh with the ratchet-gear 64 on the controlling-shaft,—which latter as already explained, actuates the totaling and trip dials. Thus the revolution of the barrel 24, which the attendant affects by key 12, advances the "extra" dial 82, the trip-dial 61 and the totaling-dial 63; and, preferably, will be made to ring a bell. It will be recalled that this part of the apparatus cannot be operated except when the flag in position of Tariff 1 or Tariff 2, allows rotation of head 21 against the nose of lever 19. Barrel 24 with its head 21 and shaft 79 with its head might be continuous and unitary, but are preferably separated as described with respect to the flag-shaft and controlling-shaft.

*The clock.*—In Figs. 4 and 5, 86 indicates a gear on the shaft of a clock-spring having the usual ratchet-and-pawl (not shown) for winding, as at the opening 87 (Fig. 2). For convenience the numeral 86 may be referred to as the "clock." It drives a gear 88, which is in mesh with the ratchet-and-pawl gear 53 on the transmission-shaft 3 (as already described). The clock work has, of course, any suitable governor (not shown).

The rate of movement imparted by it to the transmission-shaft 3 (through ratchet-gear 53) is slower than the movement imparted to this shaft by the vehicle (by ratchet-gear 49); consequently, while the vehicle is in motion, the clock and its gear 53 move idly and gear 49 alone is rotating the transmission-shaft (and thence the dials), but when the vehicle comes to a stand-still then the movement from the clock is imparted to the transmission-shaft.

*Clock start and stop.*—Upon plate 6', at 89 (Figs. 4 and 17) is pivoted an elbow-lever whose forward arm 90 carries a stud in position to be acted upon by the cam 29 on the controlling-shaft, while its rear arm is split into three parts, the middle one of which, 91, is bent into a spring tongue that can be brought to bear against the balance-wheel 92 leading from the clock mechanism (the intermediate train between main gear 86 and the balance-wheel being omitted from the drawing because the same may be of any well-known construction). The two side members of the lever on either side of tongue 91 serve to give it lateral rigidity. When the vehicle is "vacant," the flattened portion 30 of cam 29 permits spring 93 to force tongue 91 against the balance-wheel 92, which stops the clock; but when the flag is moved into the position of "Engaged," the cam 29 raises the arm 90, which not only disengages tongue 91 from the balance-wheel, but likewise gives the latter a sidewise "wipe" or blow, which positively starts the balance-wheel to reciprocating in its well-known manner. By means of this part of my invention the clock will run only while the vehicle is engaged, so that less winding will be required, and moreover when the vehicle becomes engaged the clock will be started up at once.

*Indicating non-charged time.*—In normal operation, while the vehicle is "engaged," the clock will be running without affecting the dials, as just explained. But when the vehicle though "engaged," is detained, as by a punctured tire or other break-down for which the passenger is not responsible, the clock should not effect any movement of the dials. Nevertheless, it may be desired to keep an account of such "non-charged time." This function of causing the clock not to register charges on the dials, but to register it elsewhere, is performed by the following mechanism: The gear 88, instead of being mounted in fixed bearings, is a "floating gear," mounted upon an arm 94 that is pivoted concentrically with the clock gear 86; a spring 95 tends to hold the gear 88 in mesh with the gear 53 on the transmission-shaft 3, while means are provided for forcing gear 88 out of mesh, and into connection with devices for separately registering the non-charged time. These means comprise: an elbow-lever pivoted at 96, and having one end 97 in operative relation to the pin 35 (Figs. 3 and 4), while its other end 98 is in operative relation to the arm 94 that carries the floating-gear 88. The pin 35 on the controlling-shaft 2 is so located with respect to the flag, that when the flag is in its lowermost position (and then only) the pin depresses the arm 97 on the elbow lever, to disengage the clock from the dials, and connect it with the non-charging mechanism.

Upon the floating-gear 88 are a number of equidistant pins 99 parallel to its axis and arranged in a circle concentric therewith (see Figs. 4, 15 and 16). 100 is a crank shaft having two rigid arms, one, 101, extending toward the pins 99 and the other arm 102 carrying a spring-actuated pawl 103, which co-acts with a circular ratchet 104, another anchored pawl 105, and also co-acts with ratchet 70. Upon the shaft of this ratchet 104 is the dial 106. A pointer 107 (shown as mounted on the same post which carries the anchored pawl 105) is arranged just opposite the scale on dial 106, the pointer and the adjacent portion of the dial being visible through an aperture at the back of the casing (see Fig. 2). A spring 108 tends to force the arm 101 toward the pin 99 on the floating-gear 88. But the parts are so proportioned that when the floating-gear 88 is in its normal engagement with the dial-trains, the arm 101 is just out of reach of the pins 99; whereas, when the floating-gear 88 is shifted out of engagement with the dial-trains, these pins 99 successively engage the end of the arm 101, each pin moving this arm 101 a short distance (to the left in Fig. 4) until it escapes, whereupon spring 108 draws it back (to the right). This return-movement causes the pawl 103 to carry the ratchet 104 one step forward (counter clockwise), where it is retained by the anchored pawl 105, and so on continuously as long as this engagement continues.

Figure 6:
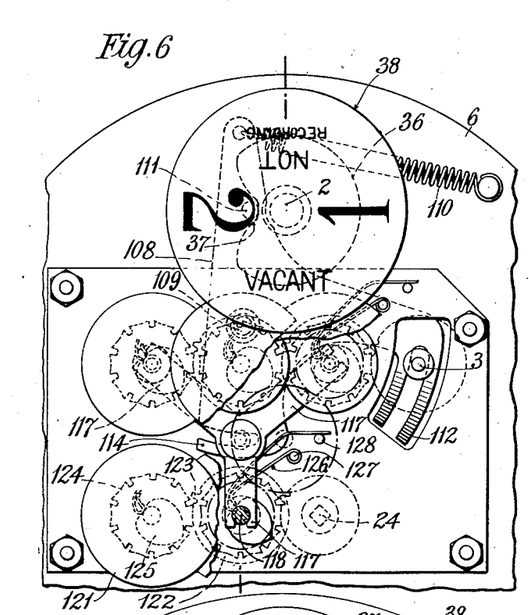
Fig. 6 is a front view of a detail of the front part of the mechanism removed from the casing, showing, among other things, the means for re-setting the dials at zero, etc.
Figures 7, 9:
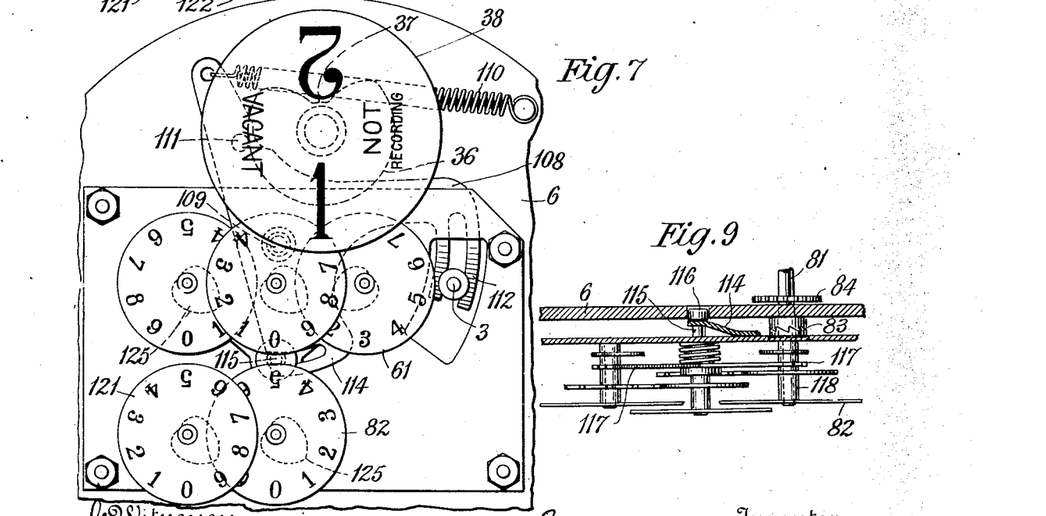
Fig. 7 is the same as Fig. 6 except the parts have been moved in a different position.
Figs. 8 and 9 are side views, partly in section, of details relating to Figs. 6 and 7.

*Return to zero.*—This is performed automatically, by returning the flag to vacant. Near the forward end of controlling-shaft 2 has been described the cam 36 with its cam-seat 37 (see Fig. 3, and Figs. 6 to 9). A plate, 108, constituting a three-armed lever is pivoted at 109 to the frame-plate 6. A spring 110 attached to the upper end of this plate draws it toward controlling-shaft 2, and a pin 111 on the plate engages the edge of cam 36 (Fig. 6). When the flag is in its "Vacant" position, pin 111 rests in the bottom of cam-seat 37, but as the flag is shifted and rotates the controlling-shaft 2, the swell of the cam-surface forces pin 111 and plate 108 to the left, as seen in Fig. 7. At the right hand of this three-armed lever or plate 108 is a concentric slot, constituting a fork 112 that straddles the transmission-shaft 3 in front of a collar 113 (see Fig. 15). This portion of the plate 108 is forwardly offset, so that in the Tariff 1 position the flat spring 57 forces the shaft 3 forward (to the left, Fig. 15), to engage clutch 55—56, but when spring 110 is permitted to draw the plate 108 over to vacant, the fork 112 forces collar 113 and shaft 3 rearward, against spring 57, to disengage this clutch (for a purpose to be explained below).

Figure 8:
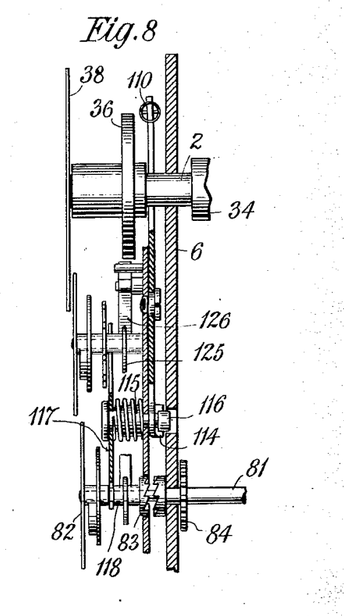

At the lower end of the three-armed lever or plate 108 is another fork 114, offset rearwardly, which in like manner straddles a spring-pressed stem 115, bearing against the head 116. The front of this stem 115 carries the spider-plate 117, whose ends are slotted to engage the stems 118 of alternate dials, as shown in Figs. 6 and 8. These stems constitute hubs on spindles; the hub of the first trip-dials 61 having the clutch engagement 62 with the crown-ratchet on controlling-shaft 4, and the hub of the first extra dial 82 having similar clutch engagement 83 with the crown ratchet on shaft 81.

When the spring 110 draws the plate 108 toward it, the fork 114 permits stem 115 to be forced forwardly by its spring; whereby the spider carries forwardly the three dial shafts engaged by it. This forward movement of the alternate dial-shafts serves to disengage them not only from their clutch engagements 62, 83, etc., but also from their engagements with the dial-shafts not directly controlled by the spider,—so that all of the other trip-dials are now free to be returned to zero by suitable devices.

On the front of the apparatus the first (right-hand) dials 119 and 120 (for "units") are shown as dummies representing zero, because 10 cents is assumed as the minimum amount to be recorded. The drawing shows two movable dials 82 and 121 for recording "extras" for one trip. The shaft of dial 82 is one of those engaged by the spider; and on this shaft is a disk 122 having a single tooth 123 (Fig. 6), which at each revolution advances the shaft of the next dial, 121, one step, by engaging the Geneva gear 124 thereon. The untoothed periphery of disk 122 serves as a lock to prevent movement of Geneva gear 124 in either direction except when the latter is being actuated by the tooth; but, when the shifting of the flag to "Vacant" causes fork 114 to permit the spring of the spider-stem 115 to force forward the spider and the dial-shafts engaged by it, then the disk 122 and the gear 124 are no longer in the same plane, and consequently dial 121 is free to be returned to zero by the devices about to be described; and, at the same time the clutch-engagement 83 that carries dial 82 is disengaged from its shaft 81, to permit dial 82 itself to be returned to zero by similar means. Fig. 1 shows three movable dials for registering the trip charges. These dials are similarly engaged and driven one from the other, and are similarly disengaged by the action of the spider-arms 117, to be returned to zero by similar devices.

Fast on the shaft of each of the dials of the two trip-series (in front of the taximeter) is a heart-shaped cam 125, with which co-acts a spring 126. These springs are shown as V-shaped, anchored by one arm at 127, having the bottom curved toward the cam (with which it is in constant contact), and having the outer arm bent to ride against post 128. This arrangement provides uniform tension, always tending to force the spring toward the center of the cam (as seen in Fig. 6), which brings the zero to the bottom of the dial, and in plain sight (as indicated by Fig. 7 and Fig. 1).

*To prevent charging a remainder to a new passenger.*—One complete revolution of the transmission-shaft 3 advances the controlling-shaft and its dials one step only, which in practice would represent a quarter-mile of travel (or six minutes of waiting). The rotation of the controlling-shaft and dials is not continuous, however, but intermittent,—one step of the controlling-shaft for each complete revolution of the continually-turning transmission-shaft. Consequently, if the vehicle with one passenger has almost but not quite completed a current quarter-mile (or six-minutes period), and shaft 3 has likewise almost but not quite completed a current revolution, and is about to move the controlling-shaft and dials another step,—and if the transmission-shaft remains in that position after the dials have been restored to zero by the attendant,— then the next passenger would almost immediately be charged (unfairly) as for a full quarter-mile.

Figures 14, 14A:
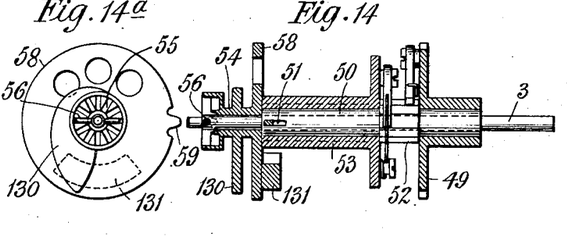
Figs. 14, 14a, and 14b, and Figs. 15, and 15a, are details relating to the control of the dials for re-setting etc.
Figure 14B:
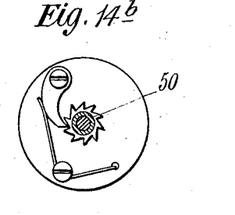

Figs. 14 to 15ª, taken with Figs. 6 and 7, illustrate means for preventing this unfair charging, by restoring the transmission-shaft and its parts to the proper position, viz: at the beginning (instead of midway) of a complete revolution, leaving tooth 59 just in front of Geneva-gear 60, instead of in a further-advanced position.

Figure 15:
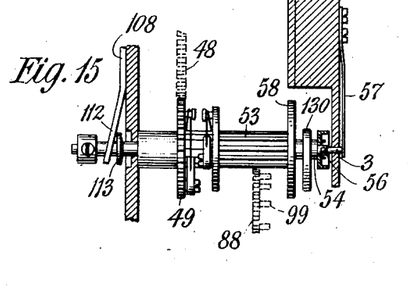
Figure 15A:
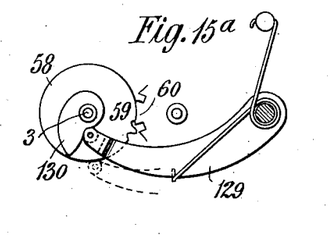

Fig. 15 represents the operating-position of the transmission-shaft, in clutch with sleeve 50 and driving-disk 58, whose tooth 59 actuates gear 60 on the controlling-shaft. (See Fig. 15ª). But when the flag is moved to Vacant, Fig. 6, the fork 112 forces transmission-shaft 3 rearward, against spring 57, and disengages the clutch 55—56; thereupon sleeve and disk 54—58 are now loose on the shaft; and spring-pressed arm 129 co-acts with the cam-face of the snail-shell cam 130 carried by the sleeve 54, to rotate disk 54—58 in the reverse direction (the reverse of the arrow in Fig. 15ª),—leaving the parts in such position that when the vehicle is again engaged, and the various trains set in operation, the tooth 59 of this disk must make a complete revolution before it actuates Geneva gear 60 of the operating-shaft. A weight 131, properly located on the disk 58, contributes to this return; and the opposite portion of the disk may be lightened, as by the holes shown in Figs. 14 and 14ª.

*The odometers* (see Figs. 4 and 13).— On the lower portion of the same vertical drive-shaft 41 that actuates the charging-dials, is a second worm 132, which engages worm-gear 133 that actuates a spur-gear 134 in mesh with a gear on shaft 135. Preferably this shaft has a clutch-engagement with the shaft 136, which carries a tooth 137, that actuates a Geneva gear 138 on the shaft of the first of the primary odometer-dials 139; and so long as the vehicle is in motion, the dials of this primary row (beginning with dial 139) will be recording the mileage. The shafts 135 and 136 might be continuous and unitary; but are preferably made separate for convenience in assembling.

On the two adjacent ends of shafts 135 and 136 respectively are the two identical gears 140 and 141, 140 being fast on its shaft 135 while 141 turns loosely on shaft 136. At 142 is pivoted a lever 143, which carries an idle gear 144 adapted to mesh simultaneously with the two gears 140 and 141, and thereby lock them together; but idler 144 is normally held out of engagement. On the loose gear 141 is a single tooth which actuates the Geneva-gear 145 on the shaft of disk 146, which is the first of the lower or secondary odometer-series, and which in turn actuates the other dials of this series.

The upper end of lever 143 rests upon head 25 (of the controlling-shaft), where it will be acted upon by either of the two pins 27, which latter are so located as to come into play when the flag is at Tariff 1 or at Tariff 2 (but at no other time), to force the lever 143 to the right, thereby bringing idler 144 into mesh with the two gears 140 and 141. Consequently, when the vehicle is not engaged, the upper or primary odometer 139 will be recording, but not the lower dials 146; but when the vehicle is engaged, both series will be recording, this operation being controlled by the flag. By means of this feature of the invention, the owner of the vehicle, upon deducting the total of the secondary odometer from that of the primary odometer, can ascertain what distance the vehicle has traveled without recording charges,—which serves as a check upon the attendant's returns.

*Operation.*—On leaving the garage in the morning, the flag will be at "Vacant"; and, as the vehicle rolls along, none of the parts will be operating, except the primary odometer, whose dials are actuated from the vertical shaft 41 and its lower worm 132, etc. When the driver obtains a passenger, he moves his flag down to "Tariff 1" (or "Tariff 2"—in which case the same operations follow). This produces the following six simultaneous operations, viz: (1) brings all the trip-dials into gear; (2) records the initial charge; (3) brings into gear the trains leading to all the dials; (4) sets the clock in motion; (5) allows extras to be charged up; and (6) sets in train the secondary odometer. The flag's movement causes triangular plate 108 (through its fork 114) to draw rearward the spider-arms 117, to bring the shafts of the various trip-dials into engagement with each other and with the clutches, on their respective driving-shafts, so that these dials can be operated.

The second of the six simultaneous operations, the transmission of the initial charge, is as follows: partial rack 28 (on controlling-shaft 2)—Geneva gear 77 and gear 78 (on the same shaft)—gear 67 (on operating-shaft 4)—the operating shaft 4 itself, which latter carries at its rear the first totaling-dial 63, and at its front (by clutch engagement 62) the first trip-dial 61. This recording of the initial charge moves the gear 67 and the operating-shaft 4, without moving the sleeve 70 or Geneva gear 60; and the upper wall of the cut-away portion of disk 69 (carried by gear 67) will be left resting against the upper side of pin 73 (carried by sleeve 70), as seen in Fig. 12ª.

The third of the six simultaneous operations, permitting "extras" to be charged, is accomplished by the traverse of head 14, which (by means of cam-seat 15, or 16) permits tooth 20 to pass by the nose of lever 19, and the charging of extras, when proper, is accomplished by the attendant inserting his key 12 into the aperture 24 at the back of the apparatus, and giving it one complete revolution, which actuates the following train: barrel 24 and shaft 79 with its single tooth—the Geneva gear (on shaft 81)—shaft 81, and the first of the "extra" dials 82; likewise gear 84 (on said shaft 81)—intermediate gear 85—gear 64 (on the controlling-shaft)—controlling-shaft 4, which carries the first of the totaling dials 63, and also the first of the trip-dials 61. The extras are thus simultaneously recorded upon three sets of dials, and preferably the turning of the key will likewise ring a bell or other alarm.

As the fourth of the six simultaneous operations, the movement of the flag likewise brings floating-gear 46 (or 47) into mesh with the larger differential 33; whereupon as the vehicle proceeds on its way, motion is imparted (through the flexible shafting) to the vertical shaft 41, and thence by the following train: worm and worm-gear 39—gear 42—floating-gear 43 (or 44)—differential 33—gear 48—gear 49 (on transmission-shaft)—disk 58 (on the same shaft), with its single tooth 59—Geneva gear 60 (loose on controlling-shaft 4) and its pawl-and-ratchet 71—72, with pin 73. Each complete revolution of transmission-shaft 3 with its tooth 59 would suffice to advance the Geneva gear 60 (and the dials) one step, corresponding to a quarter-mile travel (or a six-minute wait); but the extent of the gap in disk 69, into which pin 73 extends, is such that the first complete revolution of transmission-shaft 3 will merely serve to bring pin 73 down to the lower shoulder of this gap,—in short, the first complete revolution of shaft 3 advances Geneva gear 60 one step, but idly; and it will only be the second and subsequent revolutions of that shaft 3 which will be transmitted to the dials. Consequently, the passenger having been charged in advance for the minimum of a half-mile (usually 30 cents), the controlling-shaft will not be revolved to charge in advance for the third quarter-mile, until upon and by the completion of the second revolution of the transmission-shaft (coincident with the completion of the first half-mile); and, at this completion of the first half-mile, it is this second complete revolution of the transmission-shaft and of its tooth 59 that advances the gear 60 and with it the controlling-shaft and the dials.

The fifth simultaneous operation, the starting of the clock, is caused by means of cam 29 operating the spring-tongue 91, whereupon the clock transmits its motion by the following train: gear 86—floating-gear 88—gear 53 (on transmission-shaft 3)—said transmission-shaft 3—disk 58 and its tooth 59—Geneva gear 60 on the operating-shaft 4, etc. But the rate of revolution imparted to ratchet-and-pawl gear 53 from the clock is less than that imparted to ratchet-and-pawl gear 49 from the movement of the vehicle; consequently the clock and its gear 53 are running idly, as it were, so long as the vehicle is in motion. But when the vehicle comes to a standstill, ratchet-and-pawl gear 49 will no longer be rotated, and thereupon the rotation imparted from the clock to gear 53 will be transmitted to the transmission-shaft 3, and thence to the controlling-shaft and the dials.

The sixth of the six simultaneous operations is that one of the two pins 27 causes lever 143 (by means of idler 144) to lock together gears 140 and 141; whereby vertical shaft 41 imparts its motion to both odometer trains.

Should the vehicle burst a tire or meet with other breakdown for which the passenger is not to be charged, or should it be desired to keep record of any waiting, the attendant moves his flag to the lowermost position, and the pin 35 (on controlling-shaft 2) causes elbow-lever 97—98 to disengage floating-gear 88 from gear 53 on transmission-shaft 3—bringing said floating-gear into operative relation with the separate indicating devices consisting of arm 101, etc., dial 106 and pointer 107. By moving the flag back to Tariff 1 (or Tariff 2) the clock is restored to gear with the transmission-shaft, as before.

When the trip is completed, and the passenger's charges have been settled, the attendant moves his flag all the way around to the topmost "vacant" position, which not only restores the operating-parts to their condition of inactivity, but likewise restores the front dials to zero by the following mechanism: cam 36 with its cam seat 37—pin 111 and plate 108—fork 114 and shoulder 116—spider-arms 117 (whereby the various dials are disengaged from each other and from the operating parts)—cams 125 and springs 126, whereby the cams are restored to zero; likewise, from plate 108; fork 112 and collar 113 (on transmission-shaft 3)—clutch 55 and 56 disengaged—snail-shell 130 and spring-arm 129 whereby transmission-shaft 3 is turned backward to the beginning of the current revolution.

Where ratchet-engagement is indicated, any convenient ratchet-and-pawl mechanism is intended, such as shown in Fig. 14$^b$, or a crown-ratchet with a spring-pressed plunger 68 (such as indicated in Fig. 12) may be used, or any suitable device for the purpose. In like manner, when clutch-engagement or clutch-ratchet is indicated, the construction illustrated at 83 in Fig. 8, or at 55—56 in Fig. 14, or any suitable device, may be employed. It is further manifest that springs of other forms than the particular ones shown may be employed for the various springs set forth. Moreover, although "dials" have been shown and described, wheels having numbers on their peripheries, or other forms of indicating-means, could be employed. Again, although I have shown and described a "flag" and its "flag-shaft", yet any handle or other device for manipulating the parts could be employed.

In thus disclosing the invention, the preferred embodiment thereof has been shown and described with great completeness of detail, but only for the sake of clearness in setting forth the invention, and without limiting the invention to the precise construction and arrangement of parts thus set forth; since it is obvious that parts of the invention could be used with great satisfaction to the exclusion of other parts, that changes could be made in the details of construction and arrangement of the parts, that the relative position of many of the parts could be changed, and that various parts could be inverted or transposed, without in any case departing from the spirit of the invention.

Having thus described my invention, I claim:

1. The combination, with a taximeter, of a flag and flag-shaft, a controlling-shaft actuated by said flag-shaft, a driving-shaft receiving movement from the vehicle, a clock, a transmission-shaft, a controlling-shaft, and dials actuated by said controlling-shaft, of means including a ratchet-gear for imparting movement from said vehicle-driven shaft to said transmission-shaft, means including a ratchet-gear for imparting movement from said clock to said transmission-shaft, a clutch carried by said transmission-shaft for advancing said controlling-shaft one step for each of its own revolutions, means actuated by the attendant for imparting movement to said controlling-shaft for charging up extras, means for restoring the dials to zero and disengaging said clutch, and means for automatically reversing said transmission-shaft, said clutch and all of said means being controlled by said flag.

2. The combination, in a taximeter containing trip-dials, extra-charging dials, totaling-dials, a primary odometer, a second odometer, a shaft driven by the vehicle, a clock, and a flag, of means for actuating said dials for charging up extras, means for locking the first-named means against operation, means for actuating said trip-dials and totaling-dials from said clock, means for actuating said two sets of dials from said vehicle-driven shaft, means for bringing said secondary odometer into and out of engagement, means for starting and stopping said clock, and means for returning said trip-dials and extra-charge dials to zero,—all of said means being controlled by said flag.

3. In a taximeter, the combination of trip-dials, extra-charging dials, totaling-dials, a shaft driven by the vehicle, a clock, and a flag, of means for actuating said dials for charging up extras, means for locking the first-named means against operation, means for actuating said trip-dials and totaling-dials from said clock, means for actuating said two sets of dials from said vehicle-driven shaft, means for starting and stopping said clock, and means for returning said trip-dials and extra-charge dials to zero,—all of said means being controlled by said flag.

4. The combination, with a taximeter containing a series of trip-dials, a series of extra-charge dials, and a series of totaling-dials, all normally out of action, of a flag manipulated by the attendant, means actuated by said flag for imparting to said trip-dials and said totaling-dials the initial charge, other means actuated by said flag for bringing said trip-dials and extra-charge dials and totaling-dials into action, and additional means actuated by further manipulation of said flag for restoring the trip-dials and the extra-charge dials to zero.

5. The combination, with a taximeter containing a series of trip-dials and a series of totaling-dials, all normally out of action, of a flag manipulated by the attendant, means actuated by said flag for imparting to said dials the initial charge, other means actuated by said flag for bringing said dials into action, and additional means actuated by further manipulation of said flag for restoring the trip-dials to zero.

6. The combination, with a taximeter containing charging-dials, odometer-dials, a clock, and trains for each that are normally out of action, of a controlling-shaft, means for manipulating the same, a rack on said shaft for actuating the train to register the initial charge, a cam on said shaft for connecting the odometer-train, a second cam on said shaft for connecting said charging-dials with their train and causing them to register either of two rates, a third cam on said shaft for starting and stopping the clock, a fourth cam on said shaft for causing the clock to actuate a separate register, and a fifth cam on said shaft for restoring the charging-dials to zero.

7. The combination, with a taximeter containing charging-dials, odometer-dials, a clock, and trains for each that are normally out of action, of a controlling-shaft, means for manipulating the same, a rack on said shaft for actuating the train to register the initial charge, a cam on said shaft for connecting the odometer-train, a second cam on said shaft for connecting said charging-dials with their train and causing them to register either of two rates, a third cam on said shaft for starting and stopping the clock, and a fourth cam on said shaft for restoring the charging-dials to zero.

8. The combination, with a taximeter, of dials, a train for actuating said dials and including an operating-shaft, a train for transmitting the initial charge and containing a ratchet-gear for actuating said shaft, a train adapted to be driven from the vehicle for imparting movement to the said shaft, a clock normally held against operation, a third ratchet-gear and a train for imparting the clock-movement to said shaft, and a device manipulated by the attendant for registering the initial fare and engaging said train from the vehicle and starting said clock.

9. The combination, with a taximeter containing a flag, a controlling-shaft, and indicating-dials actuated from said shaft by clutch-engagement, of a transmission-shaft, a ratchet-gear for imparting movement from a train to said transmission-shaft, a clutch carried by said transmission-shaft for transmitting its movement to said controlling-shaft, means actuated by said flag for controlling said train, other means actuated by said flag for disengaging said clutches, and automatic means for reversing said transmission-clutch when disengaged.

10. The combination, with a taximeter containing dials and a flag for manipulating the apparatus, of a shaft for operating said dials, a transmission-shaft receiving movement, a clutch carried upon said transmission-shaft and serving upon each revolution to advance said first-named shaft one step, and means manipulated by the attendant for disengaging said clutch and said dials and thereupon automatically restoring said dials to zero and reversing said clutch to the beginning of its rotation.

11. The combination, with a taximeter containing a flag and dials, of a transmission-shaft and means for imparting movement thereto, a clutch carried by said shaft and actuating said dials one step upon each revolution, a device actuated by said flag to disengage said clutch, and a spring-arm that thereupon reverses said clutch to the beginning of its current revolution.

12. The combination, with a taximeter, of dials for recording extras for one trip, dials for recording fares and extras for one trip, totaling-dials for fares and extras, means for actuating the respective dials, means for restoring the two first-named sets of dials to zero, and a flag manipulated by the attendant for controlling all of said means.

13. The combination, with a taximeter, of dials detachably engaged with their shafts, means for actuating the same, means for disengaging said dials from said shafts for restoring said dials to zero, and a flag manipulated by the attendant for controlling all of said means.

14. The combination, in a taximeter having trains including shafts for imparting movement to the dials, and having dials with detachable engagement with said shafts, of a flag controlling the same, and means actuated by further manipulation of said flag for disengaging said dials from said shafts and thereby restoring said dials to zero.

15. The combination, in a taximeter containing dials and trains for actuating the same, of a pivoted flag, means actuated by the flag during one period of its movement in a forward direction to register the initial charge and to set the said trains into operative relation, other means actuated by said flag during another part of its movement in the same direction to render the trains inoperative and to restore the dials to zero, and devices to prevent the reversal of said flag during its two aforesaid operative movements.

16. The combination, with a taximeter containing dials and trains for actuating the same and a flag for controlling them, of a train manipulated by the attendant for charging up extras upon said dials, of a lock to prevent the operation of said extra-charging train, and means actuated by said flag to control said lock.

17. The combination, with a taximeter containing dials and trains driven by the travel of the vehicle for actuating the same and a flag for controlling them, of a clock and a clock-train leading to the same dials aforesaid, a separate clock-register, and a device controlled by said flag for disengaging said clock from said dials and engaging it with said separate register.

18. The combination, with a taximeter containing dials, a train for imparting movement from the vehicle to said dials at either of two rates, a flag for bringing said train into and out of operation at either of said rates, and a clock and its train for imparting its movement to said dials, of means actuated by said flag for simultaneously starting said clock and bringing said vehicle-train into operative relation and for simultaneously stopping said clock and bringing said vehicle-train out of operation.

19. The combination, in a taximeter, of shafts, dials having detachable engagement therewith, means for actuating the same, means for disengaging said dials from said shafts, and devices for automatically restoring said dials to zero, and a flag controlling all of said operations.

20. The combination, with a taximeter, of dials, actuating-trains therefor, a flag controlling said trains, and a lock provided with a removable key for positively securing said flag in its various positions.

21. The combination, in a taximeter, of dials slidable longitudinally upon their spindles and having clutch engagement therewith, other dials intermediate the first-named dials, all of said dials constituting a successively-actuated series, automatic means for actuating said series, a plate engaging the spindle of the first-named dials and movable to shift the same longitudinally, and devices actuated by the attendant for shifting said plate and clutch-engaged dials.

22. The combination, in a taximeter, of dials slidable longitudinally upon their spindles and having clutch engagement therewith, other dials intermediate the first-named dials, all of said dials constituting a successively-actuated series, automatic means for actuating said series, a plate engaging the spindle of the first-named dials and movable to shift the same longitudinally, devices actuated by the attendant for shifting said plate and clutch-engaged dials, and automatic means for restoring all of said dials to zero.

23. The combination, in a taximeter, of a series of dials successively driving one another, the alternate dials of said series being mounted on hubs longitudinally slidable on their spindles, trains for imparting rotation to said dials, automatic means for actuating said series, means for bringing said train and dials into and out of connection, means for sliding said hubs to shift said dials out of engagement with each other and their train, a flag manipulated by the attendant to control all of said means, cams mounted upon the spindles of said dials, and springs bearing constantly upon said cams with uniform tension to restore the same to zero when they are shifted as above.

In testimony whereof I have signed this specification in the presence of two subscribing witnesses.

JOSEPH WILLIAM JONES.

Witnesses:
C. A. L. MASSIE,
RALPH L. SCOTT.